Figure 1:
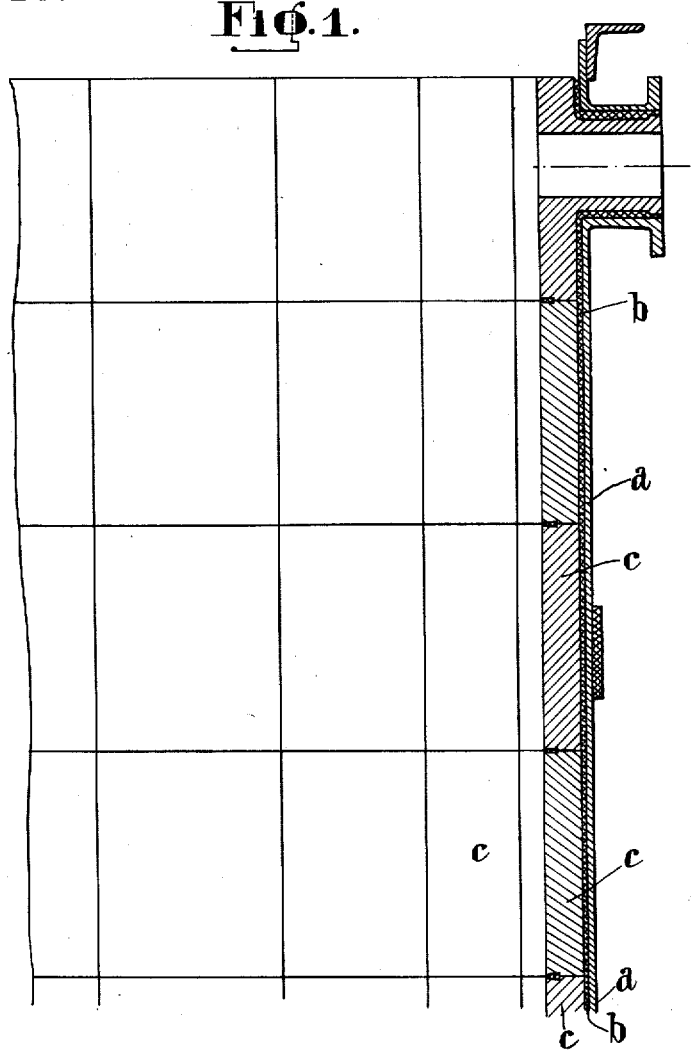

W. HAYHURST.
VESSEL FOR CONTAINING ACIDS AND OTHER LIQUIDS.
APPLICATION FILED MAR. 26, 1919.

1,313,819.

Patented Aug. 19, 1919.

INVENTOR
W. Hayhurst
BY
H. R. Kerslake
ATTORNEY

UNITED STATES PATENT OFFICE.

WALTER HAYHURST, OF WOODLANDS, ACCRINGTON, ENGLAND.

VESSEL FOR CONTAINING ACIDS AND OTHER LIQUIDS.

1,313,819.  Specification of Letters Patent.  Patented Aug. 19, 1919.

Application filed March 26, 1919. Serial No. 285,354.

*To all whom it may concern:*

Be it known that I, WALTER HAYHURST, a subject of the King of Great Britain and Ireland, and resident of Woodlands, Accrington, in the county of Lancaster, England, have invented certain new and useful Improvements relating to Vessels for Containing Acids and other Liquids, of which the following is a specification.

This invention has for its object to provide an improved method for forming the joints between the tiles or the like with which acid or other liquid containers may be lined, the said material being convenient to handle and work into the joints and having very high acid resisting properties.

I have found that if the products resulting from the inter-action of aldehydes and phenols, cresols and their homologues, be heated until they become plastic, the plastic mass being then rammed or molded into the joints between the tiles lining a vessel, and if, after the molding is completed, the temperature to which the jointing material is subjected, be raised say by 100 to 150 degrees Fahrenheit, and maintained for a period, then the material sets and becomes hard and acid proof, and the whole lining has the character of a one-piece lining effectually resisting penetration by the contained liquid.

My invention therefore consists in the formation of the joints between the tiles of a vessel lining, by the molding into the said joints of a plastic mass obtained by gently heating a product resulting from the interaction of an aldehyde and phenol, cresol, or a homologue thereof, the whole lining being then subjected to increased temperature whereby the jointing material is rendered hard and insoluble.

In one convenient application of my invention, the tiles are arranged in the lining in the vessel interior and the joints between the same are filled in with plastic substance obtained by gently heating the product resulting from the interaction of formaldehydes and phenols, cresols or their homologues. After the joints have been well filled, the temperature of the interior of the vessel is raised to form 100 to 150 degrees Farhenheit above the temperature at which the plastic mass is formed. The jointing material sets hard and becomes insoluble to most chemical materials. The lining is then in the nature of a one-piece lining which effectually protects the material of which the vessel is made.

If desired, the jointing material may have suitable fillers such as asbestos, incorporated therewith which serve to give cohesion to the mass when in the plastic state.

The jointing material may be subjected to any desired degree of temperature, maintained for a period determined by the nature of the material and the service to which it is used.

If desired, the vessel after the joints have been filled with the material aforesaid, may be placed under a vacuum or reduced pressure for assisting in the extraction of any solvent which may have been employed in the production of the plastic phenolaldehyde mass. In like manner, the vessel may be placed under pressure for assisting or expediting the setting operation.

Figure 2:
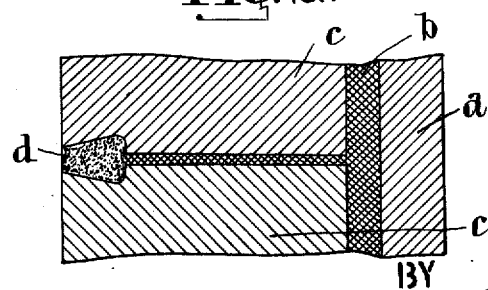

The accompanying drawing illustrates one convenient form of jointing in accordance with my invention, Figure 1 being a sectional view of a lined vessel and Fig. 2 a detail view of a joint. The steel or other metal vessel $a$ is lined with an acid resisting cement $b$ in which tiles $c$ are bedded. The adjacent edges of the tiles are recessed or cut away to provide pockets at $d$ into which the material before described is molded when in a plastic state. Finally the temperature is raised as before indicated to cause the material in the pockets $d$ to set hard.

If desired, the backing cement $b$ may be made of the same material as that employed at the face of the tiles. The latter are then embedded in the plastic material which also extends right to the tile face.

Having now described my invention what I claim as new and desire to secure by Letters Patent is:—

The combination with a metal vessel of a continuous lining of acid resisting cement arranged against the inner surfaces of the walls and the bottom of the vessel, a plurality of tiles embedded in the lining throughout the area thereof and positioned so as to leave a relatively narrow joint between the edges of the tiles, the side and end edges of the tiles being recessed near the outer faces to provide pockets and a retaining binding of acid resisting cement molded in the pockets and having the outer face lying flush with the outer faces of the tiles and having its inner portion joined with the joints of cement between the tiles.

In testimony whereof I have signed my name to this specification.

WALTER HAYHURST.